Oct. 24, 1950 H. D. BELOCK 2,526,628
REMOTE CONTROLLED POSITIONING SYSTEM
Filed April 5, 1948

INVENTOR.
HARRY D. BELOCK
BY Campbell, Brumbaugh & Free
HIS ATTORNEYS.

Patented Oct. 24, 1950

2,526,628

UNITED STATES PATENT OFFICE 2,526,628

REMOTE CONTROLLED POSITIONING SYSTEM

Harry D. Belock, Queens Village, N. Y.

Application April 5, 1948, Serial No. 18,873

3 Claims. (Cl. 200—33)

The present invention relates to remote controlled positioning systems. More specifically, it has to do with electrical systems for controlling the position of an element from a remote location.

In many instances, remote control of the positioning of an element is essential or highly desirable. Thus, a bank vault may be located at a relatively remote point in a bank and provision for remotely controlling the tumblers of the vault from another location in the bank may be highly desirable. Similarly, in the automatic tuning of a radio transmitter, operational requirements may dictate that a tunable element be automatically controllable from a remote position. Control systems for such applications must be simple yet accurate and reliable in operation. Further, they should preferably be small in size, relatively inexpensive in construction and easy to maintain. It is the purpose of this invention to provide a remote controlled positioning system which fulfills these requirements to a high degree.

According to the invention, the element to be positioned is adapted to be coupled to a driving motor by suitable clutching mechanism. The clutching mechanism is adapted to be energized by a circuit including a selector switch and novel follow-up switching mechanism movable with the element to be positioned and having a plurality of switch contacts corresponding to the several positions to which the element can be moved. Each switch contact of the follow-up switching mechanism is connected to a corresponding contact on the selector switch and the system is preferably so adjusted that for any given position of the selector switch, the circuit to the magnetic clutch is maintained closed until the element reaches the corresponding position. At that time, the circuit holding the magnetic clutch energized is opened by the corresponding switch contacts on the follow-up switching mechanism.

The invention may be better understood from the following detailed description of a typical embodiment, taken in conjunction with the accompanying drawings, in which.

Figure 1:
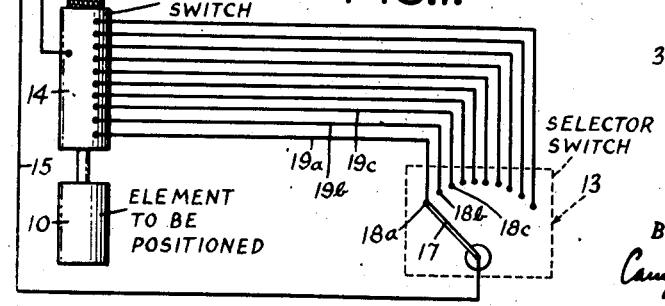
Fig. 1 is a schematic diagram of a remote controlled positioning system constructed according to the invention.

A typical remote controlled positioning system constructed according to the invention is shown in Fig. 1. The system may comprise, for example, an element 10 to be positioned which may be, for example, the tumbler control mechanism of a bank vault or a tunable element in a radio circuit. The element 10 is adapted to be positioned by a suitable motor 11 which drives through a clutching mechanism 12 of any suitable type. A magnetic clutching mechanism of the type disclosed in the copending application of Norman Zatsky for Magnetic Clutch, filed April 5, 1948, Serial No. 18,946, is especially suited for this purpose. The engagement and disengagement of the clutching mechanism 12 is controlled by means of a selector switch 13 and a follow-up switch 14 which is movable with the element 10 to be positioned.

The circuit for energizing the magnetic clutch 12 may include a conductor 15 connected at one end to the power line 16 and at its other end to the movable contact 17 of the selector switch 13. The selector switch 13 is provided with a plurality of fixed contacts 18a, 18b, 18c, etc. corresponding to the several positions to which the element 10 is to be moved. The fixed contacts 18a, 18b, 18c, etc. are connected by the conductors 19a, 19b, 19c, etc. to corresponding contacts on the follow-up switching mechanism 14 which will be described in greater detail hereinafter. The follow-up switching mechanism 14 is connected by a conductor 20 to one terminal of the clutching mechanism 12, the other terminal of which is connected by a conductor 21 to the power line 22.

Figure 2:
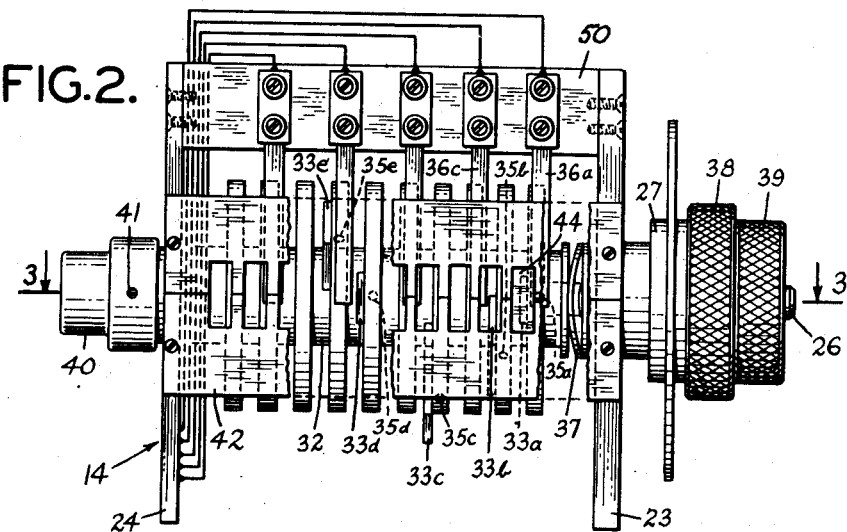
Fig. 2 is a side view in elevation of a novel follow-up switching mechanism employed in the system of Fig. 1.
Figure 3:
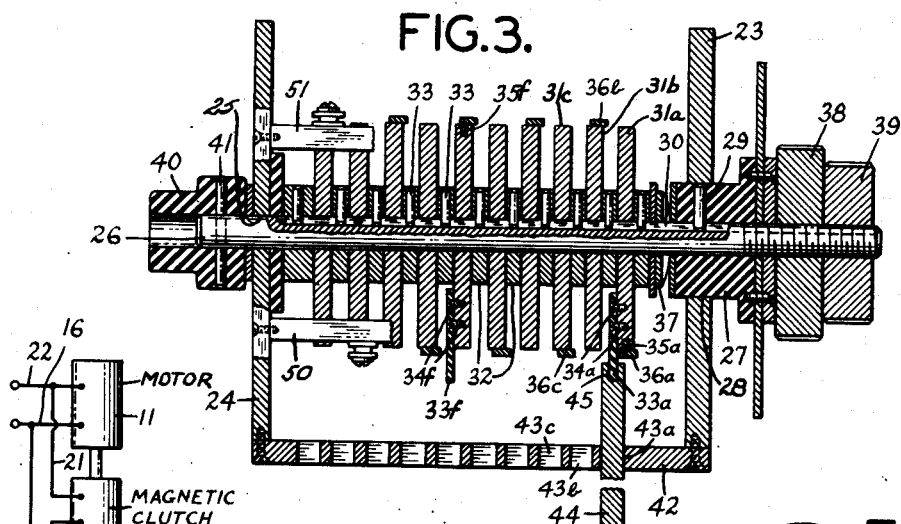
Fig. 3 is a plan view, partially in transverse section taken along the line 3—3 of Fig. 2 and looking in the direction of the arrows.
Figure 4:
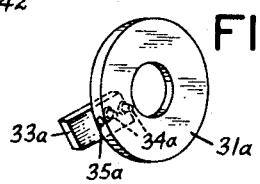
Fig. 4 is a view in perspective of a detail of the follow-up switching mechanism shown in Figs. 2 and 3.

Referring now to Figs. 2–4, inclusive, the follow-up switching mechanism 14 may comprise, for example, front and rear plate members 23 and 24 secured to the opposite ends of longitudinal members 50 and 51 to form a rigid frame. The plate member 24 is provided with a bore 25 therein in which is journalled a shaft 26 (Fig. 3) the other end of which is mounted in a bushing 27 journalled in an opening 28 in the front plate member 23. The bushing 27 is preferably mounted for rotation with the shaft 26 and also for longitudinal movement therealong. To this end, it may be provided with a key 29 which projects into a keyway 30 extending longitudinally of the shaft 26.

Mounted on the shaft 26 are a plurality of conducting disks 31a, 31b, 31c, etc., adjacent disks being separated by suitable spacing rings 32. The conducting disks 31a, 31b and 31c are preferably mounted for rotation with respect to one another and with respect to the shaft 26. The spacers 32 on the other hand, are rotatable with the shaft 26 and may be provided with keys 33 extending into the keyway 30 in the shaft 26 for this purpose.

As shown in greater detail in Fig. 4, each of the conducting segments 31a, etc. is provided with an adjusting tab 33a secured thereto in any suitable manner as by the screws 34a, for example. Also, each disk 31a carries a switch actuator 35a which projects a short distance above the rim thereof, as shown. The switch actuator 35 on alternate disks 31a is mounted substantially on the center line of the adjusting tab 33a while on the intervening disks it is mounted 180° away from this position for a purpose to be explained later.

Mounted on the longitudinal member 50 are a plurality of brush contacts 36a, 36c, etc. which engage alternate conducting disks 31a, 31c, etc. as shown in Figs. 2 and 3. A plurality of similar brush contacts 36b, 36d, etc. are mounted on the longitudinal member 51 which engage alternate conducting disks 31b, 31d, etc., as shown. Since the brush contacts 36b, 36d, etc. engage the corresponding disks at positions 180° away from the positions where the brush contacts 36a, 36c, engage their corresponding disks, the switch actuators 35b, 35d, etc. are located 180° away from the position of the switch actuator 35a shown in Fig. 4. The brush contacts 36a, 36b, 36c, etc. are connected, respectively, to the conductors 19a, 19b, 19c, etc. which go to the fixed contacts 18a, 18b, 18c, etc. of the selector switch 13. The conductor 20 leading to the magnetic clutch 12 (Fig. 1) is connected to the frame of the follow-up switch mechanism 14.

Normally, the conducting disks 31a, 31b, 31c, etc. are adapted to be rotated together on the shaft 26 in relatively fixed positions. To this end, a conventional spring washer 37 is interposed between the last disk spacer 32 and the bushing 27, and a threaded nut 38 is provided on the end of the shaft 26 for moving the bushing 27 longitudinally along the shaft 26 to compress the spring washer 37. After adjustment, the nut 38 may be locked in position by a suitable lock nut 39, for example. The other end of the shaft 26 may be retained in fixed position by means of a coupling member 40 secured to the shaft 26 in any suitable manner, as by means of a pin 41, for example.

Initially, it is necessary to adjust each of the conducting disks 31a, 31b, 31c, etc. so that when the element 10 is located at the position corresponding thereto, the corresponding switch actuators 35a, 35b, 35c, etc. will lie directly beneath the corresponding brush contacts 36a, 36b, 36c, etc., respectively, breaking the circuit between the latter and the corresponding conducting disks 31a, 31b, 31c, etc. This may be accomplished by mounting a side plate member 42 on the front and rear plate members 23 and 24, respectively, which has a plurality of slots 43a, 43b, 43c, in alignment with transverse planes through the adjusting tabs, as shown in Figs. 2 and 3. Adjustment of any disk may be effected by holding it fixed while rotating the shaft 26 until the element 10 is at the position corresponding thereto. This may be accomplished by inserting in the corresponding slot 43a, for example, a key 44 having a slot 45 at one end within which the adjusting tab 33a on the conducting disk 31a is adapted to be received.

To adjust the follow-up switching mechanism 14, the lock nut 39 is loosened and the nut 38 is unscrewed to release the pressure exerted by the spring washer 37 so that the conducting disks 31a, 31b, 31c, are free to move on the shaft 26. To adjust the conducting disk 31a for example, the shaft 26 is turned by the coupling 40, for example, until the adjusting tab 33a can be inserted within the slot 45 in the key 44 when the latter is inserted in the slot 43a. With the conducting segment 31a locked in this position, in which the switch actuator 35a lies directly beneath the brush contact 36a, the shaft 26 is turned until the element 10 is in the position corresponding thereto. The key is then removed and the remaining conducting disks 31b, 31c, etc. are adjusted in the same manner to the several positions to which the element 10 is to be located. After the adjustment has been completed, the nut 38 is tightened up so that the conducting disks 31a, 31b, 31c, etc. are tightly held in fixed relation to one another and to the shaft 26, and the lock nut 39 is then tightened down.

In operation, let it be assumed that the movable contact 17 on the selector switch 13 is moved into engagement with the fixed contact 18a, as shown, and that the element 10 is not in the position corresponding to this setting of the switch. This completes a circuit from the power line 16 through the conductor 15, the movable switch contact 17 engaging the fixed contact 18a, the conductor 19a, the brush contact 36a engaging the conducting disk 31a, the frame of the follow-up switching mechanism 12, the conductor 20, the clutching mechanism 12 and the conductor 21 to the power line 22. This energizes the clutching mechanism 12 causing the motor 11 to drive the element 10 and the follow-up switching mechanism 14. The clutching mechanism 12 remains engaged until the switch actuator 35a moves the brush contact 36a out of engagement with the conducting disk 31a at which time the element 10 will have arrived at the position corresponding to the setting of the selector switch 13. Movement of the element 10 to other positions may be accomplished by proper setting of the selector switch 13 as will be apparent from the foregoing operative description.

It will be understood from the foregoing that the invention provides a highly effective remote controlled positioning system which is simple yet accurate and reliable in operation. By virtue of the simplified construction of the follow-up switching mechanism, the adjustment of the latter to accommodate the several positions to which the element is to be moved can be easily and quickly effected. Further, the construction is relatively inexpensive and easy to maintain.

It will be readily apparent that the specific construction described herein by way of example and illustrated in the drawings can be modified in a number of respects within the spirit of the invention. Thus, the several components of the follow-up switching mechanism need not be shaped or positioned exactly as shown but may be varied within a relatively wide range. Other modifications will be readily apparent to those skilled in the art. The illustrative embodiments herein disclosed, therefore, are not to be regarded as restricting in any way the scope of the appended claims.

I claim:

1. In switching mechanism, the combination of a frame having opposite ends, a shaft journalled in the opposite ends of said frame, a plurality of conducting disks rotatably mounted on said shaft, a plurality of spacers mounted on the shaft between adjacent disks, means securing said spacers on the shaft for rotation therewith and for translation therealong, spring washer means on said shaft, a nut threaded on one end of said shaft for compressing said washer against said assembled spacers and disks, means on each disk for facilitating adjustment of the same with respect to the other disks, a plurality of brushes mounted on the frame and engaging said respective disks, and an insulated actuator member on each disk for causing the corresponding brush to become disengaged from the disk.

2. In switching mechanism, the combination of a first shaft-supporting member and a lengthwise bored bearing-bushing journaled therein for limited lengthwise sliding movement relatively thereto, a second shaft-supporting member spaced from said first member and a shaft bearing carried thereby in alignment with the bore of said bearing-bushing, a shaft rotatably journaled in the bore of said bearing-bushing and the said shaft bearing, a plurality of spaced conducting disks concentrically mounted on said shaft between the journal points thereof for free rotational movement relatively thereto and for axial displacement therealong, a plurality of spacing elements at least one being disposed between opposing faces of adjacent disks and mounted on said shaft for axial displacement relatively thereto, means securing said spacers for rotational movement with said shaft, an axial thrust bearing for said shaft for precluding axial displacement thereof relatively to the shaft-supporting members, and adjusting means for displacing said bearing-bushing toward and away from said disks and spacers to provide a unitary adjusting means for compressing contiguous disks and spacers into lateral frictional engagement to establish a switch assembly in which all of said disks rotate with said shaft and for releasing said disks for angular adjustment relatively to said shaft.

3. In switching mechanism, the combination of a first shaft-supporting member and a lengthwise bored bearing-bushing journaled therein for limited lengthwise sliding movement relatively thereto, a second shaft-supporting member spaced from said first member and a shaft bearing carried thereby in alignment with the bore of said bearing-bushing, a frame associated with said shaft-supporting members, a shaft rotatably journaled in the bore of said bearing-bushing and the said shaft bearing, said shaft projecting outwardly from each of its journal points in said supporting members, a plurality of spaced conducting disks concentrically mounted on said shaft between the journal points thereof for free rotational movement relatively thereto and for axial displacement therealong, a plurality of spacing elements at least one being disposed between opposing faces of adjacent disks and mounted on said shaft for axial displacement relatively thereto, means securing said spacers for rotational movement with said shaft, a collar on said shaft disposed on the portion thereof projecting immediately outwardly from the journal point in said second supporting member and forming an axial thrust bearing for said shaft, adjusting means including an adjusting nut threaded on said shaft for displacing said bearing-bushing toward and away from said disks and spacers to provide a unitary adjusting means for compressing contiguous disks and spacers into lateral frictional engagement to establish a switch assembly in which all of said disks rotate with said shaft and for releasing said disks for angular adjustment relatively to said shaft, a plurality of brushes mounted on the said frame for engaging said respective disks, and an insulated actuator carried by each disk causing the corresponding brush to become disengaged from the disk.

HARRY D. BELOCK.

REFERENCES CITED

The following references are of record in the file of this patent:

UNITED STATES PATENTS

| Number | Name | Date |
|---|---|---|
| 2,233,113 | Smith | Feb. 25, 1941 |
| 2,253,654 | Schroeder | Aug. 26, 1941 |
| 2,263,989 | Hill et al. | Nov. 25, 1941 |
| 2,270,176 | Van Lammeren et al. | Jan. 13, 1942 |